United States Patent [19]
Johnston

[11] Patent Number: 5,565,225
[45] Date of Patent: Oct. 15, 1996

[54] PROCESS FOR ENHANCING THE NUTRITIONAL VALUE OF SOY PROTEIN FOR THE YOUNG ANIMAL

[75] Inventor: Charles Johnston, Wooster, Ohio

[73] Assignee: The Ohio State University, Columbus, Ohio

[21] Appl. No.: 397,509

[22] Filed: Mar. 1, 1995

[51] Int. Cl.$^6$ .............................. A23L 1/00; A23L 1/20; A23L 1/211; A23L 1/202
[52] U.S. Cl. ............................... 426/2; 426/21; 426/630; 426/19; 426/28
[58] Field of Search .............................. 426/2, 21, 630, 426/19, 28

[56] References Cited

U.S. PATENT DOCUMENTS

| | | | |
|---|---|---|---|
| 3,157,513 | 11/1964 | Allen et al. | 426/18 |
| 4,079,155 | 3/1978 | Kakade. | |
| 4,132,808 | 1/1979 | Kakade. | |
| 4,377,602 | 3/1983 | Conrad | 426/656 |
| 4,378,376 | 3/1983 | Wagner et al. | |
| 4,450,176 | 5/1984 | Stahel. | |
| 4,543,264 | 9/1985 | Stahel. | |
| 4,666,719 | 5/1987 | Spiller | 426/18 |
| 5,395,623 | 3/1995 | Kovach | 426/28 |

OTHER PUBLICATIONS

Smith, et al., 1975, "The effect of different feeds, including those containing soya–bean products . . . ", Br. J. Nutr., 33:329–349.
Westland, et al., 1979, Proceedings of the Nutrition Society, The Nutrtion Society, 38:73A.
Kilshaw, et al., 1979, "Gastrointestinal allergy to soyabean protein in preruminant calves", Research in Veterinary Science, 27:366–371.
Kilshaw, et al., 1979, "Gastrointestinal allergy to soyabean protein in preruminant calves", Research in Veterinary Science, 27: 361–365.
Kilshaw, et al., 1980, "Passage of ingested protein into the blood during gastrointestinal hypersensitivity reactions", Clin. Exp. Immunol. 41:575–582.
Sissons, et al., 1979, "Passage of ingested protein into the blood during gastrointestinal hypersensitivity reactions", Clin. Exp. Immunol., 41:575–582.
Barratt, et al., 1978, "Antibody mechanisms implicated in digestive disturbances", Clin. Exp. Immunol., 31:305–312.
Barratt, et al., 1979, "Immunoglobulin classes implicated in intestinal disturbances . . . " J. Immuol., 123:676–680.
Stevenson, et al., 1979, "Plant protein effects on some immune responses in the preruminant calf", Canadian Society of Animal Science (Abst.) p. 801.
Sissons, et al., 1982, "Ethanol Denaturation of Soya Bean Protein Antigens" J. Sci. Food Agric., 33:706–710.
Sissons, et al., 1982, "Prediction of the suitability of soya–bean products . . . " Br. J. Nutr., 47:311–318.
Sissons, et al., 1982, "Effects of soyabean products on digestive processes . . . " Proc. Nutr. Soc., 41:53–61.

Sissons, et al., 1984, "Survival of dietary antigens in the digestive tract of calves . . . " Research in Veterinary Science, 37:242–246.
Miller, et al., 1984, "Immune hypersensitivity and post weaning diarrhoea in the pig", Proc. Nutri. Soc., 43:116A.
Dawson, et al., 1988, "Soy protein concentrate and heated soy flours as protein sources . . . " J. Diary Sci., 71:1301–1309.
Klasing, et al., 1988, "Hypersensitivity to dietary soy protein" PSA and SPSS (Abstract), 67:104.
Klasing, et al., 1988, "Influence of acute feed depriviation or excess feed intake . . . " Poultry Science, 67:626–634.
Li, et al., 1990, "Transient hypersensitivity to soybean meal in early weaned pig", J. Anim. Sci., 68:1790–1799.
Li, et al., 1991, "Interrrelationship between hypersensitivity to soybean proteins . . . " J. Anim. Sci., 69:4062–4069.
Li, et al., 1991, "Measuring suitability of soybean products for early weaned pigs . . . " J. Anim. Sci., 69:3299–3307.
Immunopatholigical Mechanisms. Merck Veterinary Manual, Sixth Edition pp. 410–424.
Thanh, et al., 1976, "Major proteins of soybean seeds." J. Agric. Food Chem., 24:1117–1121.
Lei, et al., 1983, "Two–dimensional electrophoretic analysis of soybean proteins" J. Agric. Food Chem., 31:963–968.
Porter. et al., 1987, "Inter–relationship between mucosal and systemic immunity . . . " Adv. Exp. Med. Biol., 216B:901–909.
Stokes, C. R., 1984, "Induction and control of intestinal immune responses" pp. 97–141 in T. J. Newby, et al., eds., C.R.C. Press, F. 4.
Baintner, et al., 1993, "Fate of the antinutritive proteins of soyabean in the ovine gut", J. Vet. Med., A40:427–431.
Ge, et al., 1993, "Predigestion of soybean proteins with immobilized trypsin for infant formula" App. Biochem. & Biotech., 43:199–209.

(List continued on next page.)

Primary Examiner—Esther Kepplinger
Assistant Examiner—Choon P. Koh
Attorney, Agent, or Firm—Calfee Halter & Griswold

[57] ABSTRACT

The present invention provides a novel soy flour-wheat flour feed, referred to herein as "MSWF feed" useful as a protein source in the diets of animals. Such MSWF feed is particularly useful for at least partially replacing milk as a protein source in the diets of young animals. The MSWF feed comprises modified soy flour, modified wheat flour and malted grain, preferably malted barley, and preferably yeast. Preferably, the wheat flour and soy flour is added in a ratio of from about 2:1 to about 0.1:9.9, by weight; and from about 0.25 to about 25%, by weight, of the combined soyflour-wheat flour weight, of the malted grain. Unlike conventional soy flour, the MSWF feed does not induce diarrhea, poor growth or weight loss associated with an allergic response. The MSWF feed is useful in the diets of young domestic animals, and is also useful as a food for humans particularly where an allergic reaction to soy flour is a problem. In the preferred embodiment, the MSWF feed is also useful in that it possesses improved suspending and dispersing characteristics when compared to conventional soy flour. The invention also relates to the process for feeding with the MSWF feed and making the MSWF feed.

16 Claims, No Drawings

OTHER PUBLICATIONS

Heppell, et al., 1989, "Sensitisation of preruminant calves and piglets to antigenic protein . . . " *Res. in Vet. Sci.*, 47:257–262.

Heppell, et al., 1987, "A comparision of the antigenicity of soya–beam based infant formulaes" *Br. J. Nutr.*, 58:393–403.

Lalles, et al., 1990, "Changes in ruminal and intestinal digestion during and after weaning . . . " *Livestock Prod. Sci.*, 24:129–142.

Lalles, J. P., 1993, "Nutritional and antinutritional aspects of soybean and field pea proteins . . . " *Livestock Prod. Sci.*, 34:181–202.

Mir, et al., 1991, "Nutritional performance of calves fed milk replacers containing processed soybean products", *Can. J. Anim. Sci.*, 71:97–106.

Newby, et al., 1976, "The nature of the local immune system of the bovine small intestine" *Immunology*, 31:475–480.

Srihara, et al., 1982, "Effect of processing and peptic digestion on the activity of soybean antigens" *J. Dairy Sci.*, 65:(Abstract) 122.

Fermentation Technology in Microbial Technology, 1979. Sec. Ed. vol. II, Ed. H. J. Peppler and D. Perlman, pp. 1–153.

Stokes, et al., "The induction of gut damage as a result of transient immune hypersensitivity to dietary antigens", *Proc. Nutr. Soc.*, 43:117A.

Microbial Technology, 2nd Ed., vol. II, Chapter 5, "Wine", Copyright 1979 pp. 131–153.

Microbial Technology, 2nd Ed., vol. II, Chapter 4, "Mold–Modified Foods" Copyright 1979, pp. 95–129.

5,565,225

PROCESS FOR ENHANCING THE NUTRITIONAL VALUE OF SOY PROTEIN FOR THE YOUNG ANIMAL

BACKGROUND OF THE INVENTION

Protein comprises a significant portion of a balanced diet of animals. Traditionally, the protein component for the young animal's diet has been supplied by milk or milk products. However, the cost of milk products has led to the search for alternate proteins from other sources to replace in whole or part the milk protein used in diets of the young animal. Due to its low cost and availability, the soybean has been used as source of protein in the diet of the young animal. Unfortunately, some species of animals, including preruminant calves, typically become allergic to the soy flour; it is believed that they become allergic to two major storage proteins, glycin and β-conglycinin, present in conventional soy flour. When conventional soy flour is fed to calves, many calves develop an allergic response to the soy flour or more particularly to components of the soy flour such as glycin and β-conglycinin. Such calves suffer loss of appetite, poor growth, low weight gain and diarrhea. Ingestion of conventional soy flour typically produces digestive abnormalities including changes in the rate of movement of digesta in the abomasum and small intestine, increased gut permeability to protein macromolecules, inflammation of the intestinal mucosa and high concentrations of circulatory IgG antibodies to glycin and β-conglycinin. Other species of young animal, including the human infant, the pig, rat, mouse and chick have also been shown to develop allergies to these proteins.

Efforts have been made to remove or inactivate the allergenic components in soy products. One process which involves extracting soy flour with alcohol and water, produces a product known as soy "concentrate." Unfortunately this process is expensive and removes a substantial portion of the valuable carbohydrate component of the soy flour. The soy concentrates also do not suspend well in water.

Another process involves separating the soy flour protein into multiple protein fractions. These products, known as "isolates," may still contain antigenic proteins, and have also had most of the carbohydrates of the soybean removed. Moreover, animals still develop allergies to some isolates and the isolates are expensive.

It is desirable to have a process which provides a soy product, particularly soy flour, that does not induce diarrhea, poor growth or weight loss in the recipient animal, does not remove other nutritionally valuable components of the soy flour and is less expensive than conventional soy products.

SUMMARY OF INVENTION

The present invention provides a novel soy flour-wheat flour feed, referred to herein as "MSWF feed" useful as a protein source in the diets of animals. Such MSWF feed is particularly useful for at least partially replacing milk as a protein source in the diets of young animals. The MSWF feed comprises modified soy flour, modified wheat flour and malted grain, preferably malted barley, and preferably yeast. Preferably, the wheat flour and soy flour is added in a ratio of from about 2:1 to about 0.1:9.9, by weight; and from about 0.25 to about 25%, by weight, of the combined soyflour-wheat flour weight, of the malted grain. Unlike conventional soy flour, the MSWF feed does not induce diarrhea, poor growth or weight loss associated with an allergic response.

The MSWF feed is useful in the diets of young domestic animals, and is also useful as a food for humans particularly where an allergic reaction to soy flour is a problem. In the preferred embodiment, the MSWF feed is also useful in that it possesses improved suspending and dispersing characteristics when compared to conventional soy flour.

The invention also relates to the process for feeding with the MSWF feed and making the MSWF feed. Preferably the process does not involve alcohol treatment of soy flour.

DETAILED DESCRIPTION OF THE INVENTION

The present invention provides a novel MSWF feed which is useful as a protein source in the diets of animals and is particularly useful for at least partially replacing milk as a protein source in the diets of young animals. As used herein and in the art of feeding animals, diet means the feedstuff or mixture of feedstuffs feed to the animal. The MSWF feed comprises modified soy flour, modified wheat flour, malted grain, preferably malted barley and preferably yeast. Unlike conventional soy flour, the MSWF feed does not induce diarrhea, poor growth or weight loss associated with an allergic response.

The MSWF feed is a useful addition to the diets of young domestic animals, including, for example, calves, lambs and pigs. The MSWF feed is also useful as a food for humans particularly where an allergic reaction to soy flour is a problem. In the preferred embodiment, the MSWF feed is also useful in that it possesses improved suspending and dispersing characteristics when compared to conventional soy flour.

The invention also relates to the process for making the MSWF feed. Preferably the process does not involve alcohol treatment of soy flour. The method for producing MSWF feed comprises the following steps: providing soy flour, wheat flour, malted grain and liquid; combining the soy flour, wheat flour and liquid to provide a mixture; gelatinizing the starch in the mixture; reacting the malted grain with the mixture, preferably in a two step process at a temperature of from about 65° to about 135° F.; reacting the malted grain with the mixture preferably at a temperature of from about 95° F. to about 150° F., to produce glucose chains and/or dextran chains; and terminating the chemical reactions.

In the preferred embodiment, the method further comprises reacting yeast with the mixture preferably at a temperature of between about 60° and 140° F.

It is believed that in the present invention malted barley proteases at least partially digest portions of soy flour and wheat flour proteins to produce polypeptides, and that the malted barley amylases at least partially digest starch strands to produce glucose chains and/or dextran chains. The activity of the malted barley enzymes either subtly changes antigenic properties of some or all of the soy flour antigens particularly the storage proteins either by subtly changing the tertiary structure or by cleavage of protein chains and/or carbohydrate chains.

Formulation

The MSWF feed is prepared from conventional starchy materials. The soy flour, before treatment according to the present invention, is conventional soy flour. Suitable soy flour is commercially available from, for example, Archer Daniels Midland under the tradename "Nutrasoy Flour." The wheat flour, before treatment according to the present invention, is conventional wheat flour, preferably Triticum aestiuum L, a hard red spring wheat sapphire flour. Suitable wheat flour is commercially available from, for example, ConAgra®.

When veal calves are to be the recipients of the MSWF feed, a non-iron fortified wheat flour is preferred. A non-iron fortified wheat flour is commercially available under the tradename "Occident" from ConAgra®.

The wheat flour and soy flour are added in a ratio of from about 2:1 to about 0.1:9.9, by weight; preferably in a ratio of from about 1:1 to about 0.5:9.5, by weight; more preferably about 1:9 by weight. The malted grain, preferably malted barley, is added from about 0.5% to about 50%, preferably from about 1 to 15%, more preferably from about 1 to about 10%, by weight, of the combined soy flour wheat flour weight. The yeast, although optional, is added from about 0 to about 35%, preferably from 0 to about 25%, more preferably from about 1% by weight, of the combined soy flour wheat flour weight.

The malted barley is preferably a low fiber bran high diastase malted barley flour; a suitable low fiber bran high diastase malted barley is commercially available from Fleischman Kurth. Malted barley contains numerous amylases and proteases at least some of which are employed in the method of the present invention. The yeast is preferably *Saccharomyces cerevisiae* such yeast is commercially available as baking yeast from grocery stores.

Preparation of MSWF feed

A liquid, containing water, preferably water, is preferably heated in a vessel to preferably about 95°–122° F. Preferably malted grain is added at 1% by weight of the soy flour and wheat flour weight. This initial addition of the malted grain, preferably malted barley, although optional, is preferred because it decreases the viscosity of the soy flour-wheat flour mixture. The soy flour and wheat flour are then added to the vessel. The mixture is stirred at a time and temperature sufficient to obtain complete mixing, preferably at a temperature of from about 75° F. to about 122° F., more preferably about 95° to about 122° F. for from about 0.5 minutes to four hours, preferably about 5 minutes. The starch in the flours is gelatinized, preferably by increasing the temperature of the mixture to between about 122° F. to about 230° F., more preferably to about 180° F., and stirring for from about 30 minutes to about four hours, preferably about 1 hour. The temperature of the mixture is preferably adjusted to between about 75° F. and about 122° F., preferably to about 95° C., to provide optimum temperatures for the barley proteases. The barley proteases digest proteins from soy flour and wheat flour, and in so doing reduce the viscosity. Optionally the pH of the mixture is adjusted, preferably with an organic acid such as citric acid, to a pH from about 4 to about 6, preferably to a pH from about 5.2 to about 5.5. The pH adjustment provides a pH range for improved malted barley enzyme activity, that is, improved amylase and protease activity. An additional 0.25% to 15%, preferably about 1 to 10% malted barley is added and stirred for from about 0.5 to about 3 hours, preferably 2 hours. The temperature of the mixture is adjusted, preferably from about 113° F. to about 140° F., more preferably to about 140° F. over about 15 minutes to 4 hours, preferably over about 10 to 30 minutes, to provide an optimum temperature for the malted barley amylases. The mixture is stirred at about 140° F. from about 15 to about 120 minutes, preferably about 30 minutes.

If the yeast is not to be added, then the reactions are terminated; preferably, temperature of the mixture is increased to a temperature for a time sufficient to terminate enzymatic reactions, preferably to between about 113° F. to about 220° F., preferably about 180° F., for about 15 minutes.

A MSWF feed with reduced antigenic properties is obtained according to the above steps; however, the dispersion and suspension characteristics of this MSWF feed in water are less preferred.

Optionally, the MSWF feed is reacted with yeast to provide a MSWF feed which also disperses well in water. The yeast is permitted to react with the MSWF feed according to the following preferred method. After the mixture is stirred at about 140° F. from about 15 to about 120 minutes, preferably about 30 minutes, the temperature of the mixture is adjusted to optimize the temperature for the yeast, to between about 60° F. to about 122° F. preferably about 90° F. The yeast is then added while stirring to maintain the yeast in suspension. The mixture is vigorously stirred preferably for about 15 minutes, more preferably about 1 to 2 hours to encourage rapid yeast growth. Optionally, the mixture sits without stirring from about 30 minutes to several hours, preferably about 3 hours. The mixture is heated for a time and temperature sufficient to kill the yeast, preferably at least about 3 minutes, more preferably about 0.5 hours at preferably 150° F. The resulting product is MSWF feed having reduced allergenic properties which disperses and suspends well in liquids such as, for example, water or milk. If the mixture containing the yeast is stirred for less than 2 hours then it is preferred that the mixture sit before heating.

If desired, the MSWF feed is dried for storage or transportation. Dried MSWF feed is preferably rehydrated with water before it is fed to an animal.

Preferably conventional nutrients are mixed with the MSWF feed to form a nutritionally complete diet, as desired.

The MSWF feed is added from about 0.5 to 35%, preferably 5 to 30%, more preferably about 14% of the total diet weight.

While the preparation of the MSWF feed has been described as involving stirring, it is to be understood that other conventional mixing methods which combine the ingredients would be suitable.

EXAMPLES

In each of the following examples the MSWF was prepared in a steam-heated, double walled stainless steel vessel from Patterson and Sons in Ashland, Ohio. The vessel has a capacity of 200 lbs. and is equipped with a ¾ inch hand drill paddle stirrer from Makita Inc.

In each of the following examples, the malted barley, which was a low fiber high diastase malted barley, was obtained from Fleischman Kurth Division of Archer Daniel Midland. The soy flour was obtained from Archer Daniel Midland under the tradename "Nutrasoy flour". The wheat flour in examples 1, 2, and 9–14 was a non-iron fortified sapphire hard red spring wheat flour sold under the trademark "Occident®" obtained from ConAgra®. The wheat flour used in Examples 3–8, which was fed to lambs, was iron fortified and was Sapphire brand of hard red spring wheat flour obtained from ConAgra®.

The yeast was generic baking yeast obtained from Smith's Bulk Food, Dalton, Ohio. The citric acid was U. S. P. fine granular manufactured by Gadot Petrochemical Industries, Haifa, Israel.

As used herein the phrase "dry matter weight" means the combined weight of the soy flour and the wheat flour.

Example 1

Malted barley was added at 1% by dry matter weight to a vessel containing 175 lbs. of water at 95° F., while stirring. About 24 lbs. of soy flour and 24 lbs. of wheat flour were added and the mixture was stirred at 95° F. for 5 minutes. With constant stirring, the temperature of the mixture was increased to 180° F. The temperature of the mixture was maintained at 180° F. and stirred for about 1 hour. The temperature of the mixture was then reduced to about 95° F. Then 10% malted barley, about 4.8 lbs. was added and stirred for about 1 hour. The temperature of the mixture was increased to 140° F. over 10 minutes. The mixture was stirred at 140° F. for 30 minutes. The temperature of the mixture was rapidly increased to about 180° F. for about 5 minutes.

Example 2

The malted barley was added at 1% by dry matter weight to a vessel containing 175 lbs. of water at 95° F. while stirring. About 24 lbs. of soy flour and 24 lbs. of wheat flour were added and the mixture was stirred at 95° F. for 5 minutes. With constant stirring, the temperature of the mixture was increased to 180° F. The temperature of the mixture was maintained at 180° F. and stirred for about 1 hour. The temperature of the mixture was reduced to about 95° F. Then 10% malted barley was added and stirred for about 1 hour. The temperature of the mixture was increased to 140° F. over 10 minutes. The mixture was stirred at 140° F. for 30 minutes. The temperature of the mixture was reduced to about 90° F. Then 1% yeast, that is 0.48 lbs. was added while stirring. The mixture was stirred about 2 hours. The mixture was heated to 140° F. over a period of 15 minutes.

Example 3 (Lamb S194) (L17)

In the vessel, 150 lbs. of water were heated to 122° F. to prepare 5.42 lbs. dry matter mixture of wheat flour and soy flour. Next 1%, that is 24.5 grams, of malted barley was added and mixed. Then 2.7 lbs. of wheat flour and 2.7 lbs. of soy flour were added in the ratio of 1:1. The mixture was stirred for 5 minutes. The temperature was rapidly increased to 180° F. within 10–20 minutes, then stirred for 1 hour. Next, the temperature was reduced to 122° F. and 1%, that is, 24.5 grams, of malted barley was added. The mixture was stirred for about 2 hours. The temperature was increased to 140° F. in about 10 minutes and stirred for about 1 hour. The temperature was reduced to 90° F. in about 30 minutes. Then 24.5 grams of yeast were added at 1% of dry matter and the mixture was stirred for about 2 hours. Then the mixture was heated to 140° F. in about 15 minutes held at 140° F. for about 5 minutes.

The MSWF feed was mixed with other dietary ingredients and water was added to bring the feed weight to 200 lbs.

Example 4 (L16)

In the vessel, 150 lbs. of water were heated to 122° F. to prepare 5.42 lbs. dry matter mixture of wheat flour and soy flour. 1%, that is, 24.5 grams, of malted barley was added and mixed. Then 2.7 lbs. of wheat flour and 2.7 lbs. of soy flour were added in the ratio of 1:1. The mixture was stirred for 5 minutes. The temperature was rapidly increased to 180° F. over about 15 minutes then stirred for 1 hour. Next, the temperature was reduced to 122° F. and 10% of the dry matter, that is 24.5 grams of malted barley, was added. The mixture was stirred for about 2 hours. The temperature was increased to 140° F. in about 10 minutes and stirred for about 1 hour. The MSWF feed was mixed with other dietary ingredients and water was added to bring the feed weight to 200 lbs.

Example 5 (L18)

In the vessel, 150 lbs. of water were heated to 122° F. 1%, that is, 32 grams of malted barley was added. Next 2.3 lbs. of wheat flour and 4.6 lbs. of soy flour were added in a ratio of 1:3 and stirred for 5 minutes. The temperature was rapidly increased to 180° F. and stirred 1 hour. The temperature was reduced to 95° F. and pH was adjusted to about 5.2–5.5 with citric acid. 1%, that is 32 grams of malted barley was added. The mixture was stirred 1 hour then the temperature was increased to 140° F. over about 30 minutes. The mixture was stirred for about one hour.

Example 6 (L19)

In the vessel, 150 lbs. pounds of water were heated to 122° F. 1% of the dry matter weight, that is, 32 grams of malted barley was added. Next 2.3 lbs. of wheat flour and 4.6 lbs. of soy flour were added in the ratio of 1:3 and stirred for 5 minutes. The temperature was rapidly increased to 180° F. and stirred 1 hour. The temperature was reduced to 95° F. and pH was adjusted to about 5.2–5.5 with citric acid. 1% of malted barley was added. The mixture was stirred 1 hour, then the temperature was increased to 140° F. over about 30 minutes. The mixture was stirred for about 30 minutes. The temperature was then reduced to 95° F. and 1% of the combined wheat flour soy flour weight, of yeast was added. The mixture was vigorously stirred 1 hour. The mixture sat, without stirring, for 3 hours. The mixture was heated to 140° F. for about 5 minutes. The resulting MSWF feed was mixed with other dietary ingredients, listed in Table 1 and water was added to bring the feed weight to 200 lbs.

Example 7 (L21)

In the vessel, 150 lbs. of water were heated to 122° F. 1%, that is 31.6 grams of malted barley was added. Next 0.70 lbs. of wheat flour and 6.2 lbs. of soy flour were added in the ratio of 1:9 and stirred for 5 minutes. The temperature was rapidly increased to 180° F. and stirred vigorously for 1 hour. The temperature was reduced to 95° F. and pH was adjusted to about 5.2–5.5 with citric acid. 1% of malted barley was added. The mixture was stirred 1 hour then the temperature was increased to 140° F. over about 30 minutes. The mixture was stirred for about 30 minutes, then the temperature was reduced to 90° F. and 1% of the dry matter as yeast added. The mixture was vigorously stirred 1 hour. The mixture was then allowed to sit, without stirring, for 3 hours. The mixture was heated to 140° F. for 5 minutes. The resulting MSWF feed was mixed with other dietary ingredients, listed in Table VII and water was added to bring the feed weight to 200 lbs.

Example 8 (L22)

In the vessel, 150 pounds of water were heated to 122° F. 1%, that is, 37 grams of malted barley was added. Next 2.06 lbs. of wheat flour and 6.20 lbs. of soy flour were added in the ratio of 1:4 and treated according to example 7. The resulting MSWF feed was mixed with other dietary ingredients, listed in Table 4 and water was added to bring the feed weight to 200 lb.

The MSWF feed of Examples 7 and 8 used in diets L-21, L-22 were analyzed and the results are shown below in Table A. For comparison, the unmodified soy flour was also analyzed.

Example 9

In the vessel, 150 lbs. of water were heated to 95° F. 1%, that is 31.6 grams of malted barley was added. Next 2.7 lbs. of wheat flour and 2.7 lbs. of soy flour were added in the ratio of 1:1 and the process of Example 7 was followed except that 24.5 grams of yeast were added and 24.5 grams of malted barley were added, and ingredients, listed in Table VII and water was added to bring the feed weight to 200 lbs.

Example 10

In the vessel, 150 lbs. of water were heated to 95° F. 1%, that is 32 grams of malted barley was added. Next 2.3 lbs. of wheat flour and 4.6 lbs. of soy flour were added in the ratio of 1:3 and the process of Example 7 was followed except that 32 yeast was added and 32 grams of malted barley was added, and ingredients, listed in Table VII and water was added to bring the feed weight to 200 lbs.

Example 11

In the vessel, 150 lbs. of water were heated to 95° F. 1%, that is 31.6 grams of malted barley was added. Next 0.79 lbs. of wheat flour and 6.2 lbs. of soy flour were added in the ratio of 1:9 and the process of Example 7 was followed except that 31.6 grams of yeast was added and 31.6 grams of malted barley was added, and ingredients, listed in Table VII and water was added to bring the diet weight to 200 lbs.

Example 12

In the vessel, 150 lbs. of water were heated to 122° F. to prepare 5.42 lbs. dry matter mixture of wheat flour and soy flour. 1%, that is, 24.6 grams, of malted barley was added and mixed for about 3 minutes. The temperature was rapidly increased to 180° F. over about 15 minutes, then 2.71 lbs. of wheat flour and 2.71 lbs. of soy flour were added in the ratio of 1:1. The mixture was stirred for 1 hour. Next, the temperature was reduced to 122° F. and 10% of the dry matter, that is 246 grams of malted barley, was added. The mixture was stirred for about 2 hours. The temperature was increased to 140° F. in about 10 minutes and stirred for about 1 hour. The temperature was then reduced to 90° F. and 1% of the combined wheat flour soy flour weight, of yeast was added. The mixture was vigorously stirred 2 hours. The mixture rested without stirring for 3 hours. The mixture was heated to 150° F. for about 5 minutes.

The MSWF feed was mixed with other dietary ingredients and water was added to bring the feed weight to 200 lbs.

Example 13

In the vessel, 150 lbs. of water were heated to 122° F. 1%, that is 32 grams of malted barley was added, and stirred for 3 minutes. Next 2.3 lbs. of wheat flour and 4.6 lbs. of soy flour were added in the ratio of 1:3 and the process of Example 12 was followed except that 1% yeast was added and 10% malted barley was added, and ingredients, listed in Table VII and water was added to bring the feed weight to 200 lbs.

Example 14

In the vessel, 150 lbs. of water were heated to 122° F. 1%, that is 31.6 grams of malted barley was added, and stirred for 3 minutes. Next 0.70 lbs. of wheat flour and 6.2 lbs. of soy flour were added in the ratio of 1:9 and the process of Example 12 was followed except that 1% yeast was added and 10% malted barley was added, and ingredients, listed in Table VII and water was added to bring the feed weight to 200 lbs.

Analysis of Typical MSWF feed

TABLE A

Typical Analytical Results of MSWF on an as Fed Basis (According to Dry Matter Shown).

| Percent | Example 7 | Example 8 | Unmodified soy flour |
|---|---|---|---|
| Dry Matter (DM) | 87.8 | 90.2 | 87.0 |
| Crude Protein | 47.9 | 44.3 | 47.9 |
| Phosphorus | .65 | .60 | .64 |

TABLE A-continued

Typical Analytical Results of MSWF on an as Fed Basis (According to Dry Matter Shown).

| Percent | Example 7 | Example 8 | Unmodified soy flour |
|---|---|---|---|
| Potassium | 1.89 | 1.64 | 1.87 |
| Calcium | .30 | .25 | .23 |
| Magnesium | .25 | .23 | .22 |
| Sulfur | .26E | .27E | .26E |
| Parts Per Million | | | |
| Manganese | 38. | 34. | 38. |
| Iron | 118. | 144. | 129. |
| Copper | 16. | 16. | 15. |
| Zinc | 40. | 51. | 43. |

E = Value is estimated
L/H = Lowest/Highest possible value detectable by Spectrograph The MSWF feed embodiment produced by treatment with yeast, preferably contains yeast cells, primarily dead yeast cells and fragments thereof and typically some live yeast cells. The presence of yeast cells both dead and alive may be determined by the Methylene Blue Staining method. Samples of fresh MSWF have been found to contain about 10% yeast cells/gram of MSWF feed. Live yeast cells may be determined by plating out a sample of MSWF feed. Select samples of MSWF feed of about 2 months age has been found to contain from about $3.4 \times 10$ to $11.4 \times 10$ yeast cells/gram.

The MSWF feed has a shelf life of at least 2 months.

TABLE C

Comparison of Amino Acid Concentration in MSWF feed to Conventional Products

| Amino acid | MSFW Feed (S21) Ex. 7 g/100 g | WC g/100 g | WI g/100 g | MSFW Feed C30 g/100 g | MSFW Feed C31 g/100 g | MSFW SEPT g/100 g |
|---|---|---|---|---|---|---|
| cysteic acid | 0.92 | 0.96 | 2.42 | 0.7 | 0.83 | 0.79 |
| aspartic acid | 5.06 | 2.45 | 2.65 | 3.42 | 4.25 | 3.23 |
| glutamic acid | 9.76 | 5.25 | 35.86 | 7.8 | 8.9 | 8.45 |
| serine | 2.47 | 1.91 | 4.5 | 1.76 | 2.17 | 2.29 |
| glycine | 2.03 | 0.6 | 3.14 | 1.35 | 1.73 | 1.9 |
| histidine | 0.92 | 0.42 | 1.37 | 0.64 | 0.86 | 0.82 |
| arginine | 2.87 | 0.62 | 3.44 | 2.2 | 2.65 | 2.98 |
| threonine | 2.19 | 1.98 | 2.7 | 1.5 | 2.06 | 2.09 |
| alanine | 2.08 | 1.76 | 2.22 | 1.32 | 1.73 | 1.88 |
| proline | 2.47 | 1.98 | 10.07 | 2.11 | 2.31 | 2.46 |
| Methionine | 0.52 | 0.6 | 0.91 | 0.28 | 0.4 | 0.48 |
| tyrosine | 0.06 | 0.03 | 0.11 | 0.02 | 0.04 | 0.03 |
| valine | 2.15 | 1.87 | 3.3 | 1.53 | 1.87 | 1.89 |
| cystine | 0.03 | 0 | 0.04 | 0.03 | 0.04 | 0.02 |
| isoleucine | 1.86 | 1.64 | 2.66 | 1.26 | 1.48 | 1.61 |
| leucine | 3.15 | 2.79 | 5.16 | 2.21 | 2.67 | 2.82 |
| phenylalanine | 6.76 | 5.35 | 12.92 | 4.96 | 5.71 | 7.9? |
| lysine | 3.01 | 2.92 | 2.14 | 1.97 | 2.47 | 2.33 |
| tryptophan | 0.71 | 0.5 | 0.94 | 0.43 | 0.66 | 0.63 |
| TOTAL | 49.08 | 33.71 | 97.6 | 35.52 | 42.87 | 44.58 |
| LECO Protein | 51.3 | 33.69 | 91.15 | 33.18 | 41.48 | 43.46 | g/100 g = grams amino acid per 100 g sample
WC = whey protein concentrate
WI = wheat protein isolate
SEPT = Size Ex. 7 (S21) MSWF feed
Methionine analyzed according to METO2.

TABLE D

Comparison of Amino Acid Concentration in MSWF feed to Conventional Products

| Amino acid | MSWF feed (S21) Ex. 7 g/100 g | WC g/100 g | WI g/100 g | MSWF feed in Ex 12 (C30) g/100 g | MSWF feed in Ex 13 (C31) g/100 g | SEPT g/100 g |
|---|---|---|---|---|---|---|
| cysteic acid | 1.87 | 2.86 | 2.48 | 1.97 | 1.94 | 1.77 |
| aspartic acid | 9.86 | 7.27 | 2.91 | 10.31 | 10.25 | 7.43 |
| glutamic acid | 19.03 | 15.58 | 39.34 | 23.51 | 21.46 | 19.44 |
| serine | 4.81 | 5.67 | 4.94 | 5.30 | 5.23 | 5.27 |
| glycine | 3.96 | 1.78 | 3.44 | 4.07 | 4.17 | 4.37 |
| histidine | 1.79 | 1.26 | 1.50 | 1.93 | 2.07 | 1.89 |
| arginine | 5.59 | 1.84 | 3.77 | 6.63 | 6.39 | 6.86 |
| threonine | 4.27 | 5.88 | 2.96 | 4.52 | 4.97 | 4.81 |
| alanine | 4.05 | 5.22 | 2.44 | 3.98 | 4.17 | 4.33 |
| proline | 4.81 | 5.88 | 11.05 | 6.36 | 5.57 | 5.66 |
| methionine | 1.01 | 1.78 | 1.00 | 0.84 | 0.96 | 1.10 |
| tyrosine | 0.12 | 0.09 | 0.12 | 0.06 | 0.10 | 0.07 |
| valine | 4.19 | 5.55 | 3.62 | 4.61 | 4.51 | 4.36 |
| cystine | 0.06 | 0.00 | 0.04 | 0.09 | 0.10 | 0.05 |
| isoleucine | 3.63 | 4.87 | 2.92 | 3.80 | 3.67 | 3.70 |
| leucine | 6.14 | 8.28 | 5.66 | 6.66 | 6.44 | 6.49 |
| phenylalanine | 13.18 | 15.88 | 15.27 | 14.95 | 13.77 | 18.32 |
| lysine | 5.87 | 8.67 | 2.35 | 5.94 | 5.95 | 5.36 |
| tryptophan | 1.38 | 1.48 | 1.03 | 1.30 | 1.59 | 1.22 |
| TOTAL | 95.8 | 100.1 | 106.9 | 106.9 | 103.3 | 102.5 |

TABLE E

Comparison of Essential Amino Acids in MSWF Feed to Conventional Feeds

| Amino Acid | Cows Milk g/100 g | MSWF Feed in Ex 7 (S21) g/100 g | WC g/100 g | WI g/100 g | MSWF Feed in Ex 12 (C30) g/100 g | MSWF Feed in Ex 13 (C31) g/100 g | SEPT |
|---|---|---|---|---|---|---|---|
| histidine | 2.7 | 1.79 | 1.25 | 1.5 | 1.93 | 2.07 | 1.89 |
| iso-leucine | 4.7 | 3.63 | 4.87 | 2.92 | 3.8 | 3.57 | 3.7 |
| leucine | 9.5 | 6.14 | 8.28 | 5.66 | 6.66 | 6.44 | 6.49 |
| lysine | 7.8 | 5.87 | 8.67 | 2.35 | 5.94 | 5.95 | 5.36 |
| met & cystine | 3.3 | 3.06 | 4.87 | 3.57 | 2.99 | 3.1 | 2.97 |
| phe & tyrosine | 10.2 | 13.3 | 15.97 | 15.39 | 15.01 | 13.87 | 18.39 |
| threonine | 4.4 | 4.27 | 5.88 | 2.96 | 4.52 | 4.97 | 4.81 |
| tyrptophan | 1.4 | 1.38 | 1.48 | 1.03 | 1.3 | 1.59 | 1.22 |
| valine | 6.4 | 4.19 | 5.55 | 3.62 | 4.61 | 4.51 | 4.35 |
| Total | 50.4 | 43.63 | 56.82 | 39 | 46.76 | 46.07 | 49.18 |
| Total - his | 47.7 | 41.84 | 55.57 | 37.5 | 44.83 | 44 | 47.29 | g/100 g = grams of amino acid per 100 g of protein

TABLE F

Comparison of Percentage of Select Amino Acid Composition In MSWF feed to Conventional Feeds vs. Cow's Milk (100%)

| amino acid | MSWF Feed in Ex 7 (S21) | WC | WI | MSWF Feed in Ex 12 (C30) | MSWF Feed in Ex 13 (C31) | SEPT |
|---|---|---|---|---|---|---|
| histidine | 66.3 | 46.3 | 55.6 | 71.5 | 76.7 | 70.0 |
| isoelucine | 77.2 | 103.6 | 62.1 | 80.9 | 76.0 | 78.7 |
| leucine | 64.6 | 87.2 | 59.6 | 70.1 | 67.8 | 68.3 |
| lysine | 75.3 | 111.2 | 30.1 | 76.2 | 76.3 | 68.7 |
| met & cystine | 92.7 | 147.6 | 108.2 | 90.6 | 93.9 | 90.0 |
| phe & tyrosine | 130.4 | 156.6 | 150.9 | 147.2 | 136.0 | 180.3 |
| threonine* | 97.0 | 133.6 | 67.3 | 102.7 | 113.0 | 109.3 |
| tyrptophan | 98.6 | 105.7 | 73.6 | 92.9 | 113.6 | 87.1 |
| valine | 65.5 | 86.7 | 56.6 | 72.0 | 70.5 | 68.0 |

Evaluation of MSWF as Calf Feed

Calf Study I

The severity and duration of the reaction of the calf to soybean flour is greater than for most other species. Thus the calf is a sensitive indicator of the allergenic properties of soy flour. Twenty-four Holstein bull calves from one to three days of age were fed a commercial veal starter diet available as "Star melk", from NRV, Inc., Ixonia, Wis. for 20 days. Commercial veal starter diet is standard non-soy feed which provides calves with nutrition the calves require for growth. During this time the calves were routinely vaccinated and medicated to assure their optimum health. The calves were implanted with Ralgro on day one and every 28 days thereafter. At day 20, calves were divided into five groups. Treatment Group A was a control group which remained on a commercial veal diet, which involved a gradual transition from the veal starter diet to a veal finisher diet available as "Fin melk" from NRV, throughout the trial. Groups B–F were fed diets as indicated in Table I, until slaughter at 126 days of age. Diet formulations with their estimated nutrient content are shown on Table II.

TABLE I

First Calf Study

| Treatment Group | Diet Number | Calf Nos. | Type | Diet |
|---|---|---|---|---|
| A. | Control | 17–20 | Control | Commercial veal starter through day 56 followed by commercial veal finisher through day 126. |
| B. | C-18 | 21–24 | MSWF feed of Example 2 | Commercial veal starter through day 20 followed by diet containing 24% MSWF which had been treated with yeast, until day 70. Thereafter the diet contained 14% MSWF. |
| C. | C-20 | 5–8 | MSWF feed of Example 2 | Commercial veal starter through day 56 followed by diet containing 24% MSWF which had been treated with yeast, until day 70. Thereafter the diet contained 14% MSWF. |
| D. | C-23 | 9–12 | MSWF feed of Example 1 | Commercial veal starter through day 20 followed by diet containing 24% MSWF which had not been treated with yeast until day 70. Thereafter the diet contained |

TABLE I-continued

First Calf Study

| Treatment Group | Diet Number | Calf Nos. | Type | Diet |
|---|---|---|---|---|
| E. | C-23 | 13–16 | MSWF of Example 1 | 14% MSWF. Commercial veal starter through day 56 followed by diet containing 14% MSWF. |
| F. | CA-21 | 1–4 | Control | Commercial veal starter through day 20 followed by diet containing 12% soy flour which had been treated with barley malt and yeast until day 60. Thereafter commercial veal finisher through day 126. |

After the calves in the treatment groups B, C, and D which received diets containing 24% MSWF feed reached approximately 70 days of age, these diets became unpalatable. The concentrations of the MSWF feed was reduced to 14% by diluting the diet with 41% the commercial veal finisher diet. After the change in the calves' diet, the feed consumption resumed to normal.

The calves in Group F were fed a diet that did not contain the MSWF feed of the present invention but instead contained soy flour, barley malt and yeast, but without wheat flour. The calves in Group F developed constipation so that the animals had to be removed from the diet by day 60. Thereafter they were fed the commercial veal finisher diet.

All calves were fed the same amount of feed twice daily throughout the study. They were individually weighed weekly and blood samples taken from each calf biweekly for analysis. All calves were maintained under conditions to support optimum performance. At the end of the study, the calves were slaughtered in a commercial veal plant where they were graded by color and yield. A summary of the average weights and average daily gains of the treatment groups at each milestone day are shown on Table III.

TABLE II

Comparison Between Ingredient and Nutrients of Diet Containing MSWF Feed to Commercial Veal Starter Exp. C-1-93 CJ/OSU (dry matter basis)

| | Diet | | | commercial veal feed | |
|---|---|---|---|---|---|
| | | | Control | | |
| Item | CA-18 | C-20* | C-21 | Starter | Finisher |
| Ingredient % | | | | | |
| MWSF Feed | 24 | 24 | 0 | | |
| Soy flour | — | — | 12 | | |
| Whey protein concentrate | 27.3 | 9.8 | 29.73 | | |
| 13/60 | 27 | 25 | 31 | | |
| Lactose | 15.7 | 35.2 | 20.27 | | |
| Vit/min premix | 2.5 | 2.5 | 2.5 | | |
| Dical | 3.05 | 2.46 | 2.97 | | |
| Ca carbonate | 1.66 | 1.21 | 1.73 | | |
| Lysine | .81 | 1.50 | .73 | | |
| Methionine | .20 | .32 | .20 | | |
| Calculated Composition | | | | | |
| ME, kcal/lb | 1905 | 1853 | 1905 | | |
| Fat, % | 17.05 | 15.49 | 19.36 | 16 | 18 |
| Crude protein, % | 22.13 | 16.25 | 22.21 | 22 | 16 |
| Lactose, % | 36.3 | 4.39 | 43.10 | | |
| Calcium | 1.56 | 1.18 | 1.56 | | |
| Phosphorous | .88 | .66 | .89 | | |
| Lysine | 2.16 | 2.16 | 2.16 | | |
| Methionine | .55 | .55 | .55 | | |

C-21 - commercial veal starter
*C-23 had the same formulation as C-20 except C-23 contained MSWF feed which did not receive yeast treatment.

TABLE III

Average Veal Calf Performance on Days 20, 56 and 126
Exp. C-1-93 CJ/OSU

| | day 1 | | day 20 | | | day 56 | | | day 126 | |
|---|---|---|---|---|---|---|---|---|---|---|
| Group | Diet | Weight | Diet | Weight | ADG | Diet | Weight | ADG | Weight | ADG |
| A. (Control) | CV | 102.8 | CV | 116.8 | .70 | CV | 196.5 | 1.68 | 419 | 2.51 |
| B. | CV | 108.5 | MSWF feed 12% SF, 12% WF BM & yeast treated | 123.5 | .75 | MSWF feed 12% SF, 12% WF, BM & yeast treated | 208.8 | 1.79 | 430.3 | 2.55 |
| C. | CV | 109.8 | CV | 120.3 | .53 | MSWF feed 12% SF, 12% WF, BM & yeast treated | 203.0 | 1.67 | 436.5 | 2.55 |
| D. | CV | 113.3 | CV | 124.0 | .54 | MSWF feed 12% SF, 12% WF, BM | 206.0 | 1.66 | 441.3 | 2.60 |
| E. | CV | 110.3 | CV | 124.3 | .70 | MSWF feed 7% SF, 7% WF, BM | 203.5 | 2.01 | 436.5 | 2.59 |

TABLE III-continued

Average Veal Calf Performance on Days 20, 56 and 126
Exp. C-1-93 CJ/OSU

| Group | day 1 | | day 20 | | | day 56 | | day 126 | |
|---|---|---|---|---|---|---|---|---|---|
| | Diet | Weight | Diet | Weight | ADG | Diet | Weight | ADG | Weight | ADG |
| F. | CV | 106.3 | 12% SF, BM & yeast treated | 123.5 | .83 | CV | 207.8 | 1.8 | 438 | 2.63 |

<sup>a</sup>ADG Average Daily Gain
SF - Soy flour.
WF - Wheat flour.
BM - Barley malt.
*last day.
CV - commercial veal starter As can be seen from Table III, the calves that were fed the MSWF feed progressed at substantially the same rate if not better than the calves that were fed the commercial veal diet. Blood analysis indicated comparable values for hemoglobin and hematocrit between the control calves and the non-control calves. The calves that were fed MSWF feed did not show any symptoms associated with allergenic reaction to soy flour. The calves that were fed the MSWF feed did not develop diarrhea nor did they display a reduced growth rate; this indicates that such calves did not develop an allergic reaction to the MSWF feed.

None of the calves which were fed the MSWF feed embodiment which lacked yeast exhibited signs of an allergic reaction. However, the MSWF feed without treatment with yeast did separate from the other feed more quickly than feeds containing yeast-treated MSWF feed. Accordingly, such embodiment of the MSWF feed is less preferred.

Quality veal and beef were produced from Holstein calves fed diets containing MSWF feed, as determined by post slaughter inspection and grading. Meat from all treatment groups was a uniformly acceptable color. Carcass yield for all calves was 68.55%.

Calf Study II

Twenty-four Holstein bull calves from one to three days of age were fed the commercial veal starter diet for 28 days, and maintained as the calves in Study I. At day 28, 12 calves were assigned to groups A, B, and C, and fed a diet containing MSWF feed. The remaining calves continued with the commercial veal starter until day 65 when they were assigned to groups D, E, and F. Treatment Group F was a control group which remained on the commercial veal diet throughout the trial. Groups A–E were fed diets as indicated in Table IV, until slaughter at 134 days of age. Diet formulations with their estimated nutrient content are shown on Table V and V(a).

TABLE IV

Second Calf Study

| Treatment Group | Diet Number | Calf Nos. | Type | Diet |
|---|---|---|---|---|
| A. | C-30 | 1–4 | MSWF feed of Examples 9 and 12. | Commercial veal starter through day 28 followed by diet containing MSWF feed of Example 9 until day 35. Thereafter the diet contained the MSWF feed of Example 12. |
| B. | C-31 | 5–8 | MSWF feed of Examples 10 and 13 | Commercial veal starter through day 28 followed by diet containing MSWF of Example 10 until day 35. Thereafter the diet contained MSWF of Example 13. |
| C. | C-32 | 9–12 | MSWF feed of Examples 11 and 14 | Commercial veal starter through day 28 followed by diet containing MSWF feed of Example 11 until day 35. Thereafter the diet contained the MSWF feed of Example 14. |
| D. | C-30 | 13–16 | MSWF feed of Example 12 | Commercial veal starter through day 65 followed by diet containing MSWF feed of Example 12. |
| E. | C-31 | 17–20 | MSWF feed of Example 13 | Commercial veal starter through day 65 followed by diet containing MSWF feed of Example 13. |
| F. | Control | 21–24 | Control | Commercial veal starter through day 28 followed by commercial veal finisher through day 134. |

TABLE V

Composition of Diets (DM) for C-1-94 CJ/OSU

| Diet | C-30 (Starter) | C-30 (Grower) | C-30 (Finisher) | C-31 (Starter) | C-31 (Grower) | C-31 (Finisher) | C-32 (Starter) | C-32 (Grower) | C-32 (Finisher) |
|---|---|---|---|---|---|---|---|---|---|
| Ingredient (%) | | | | | | | | | |
| MSWF feed | 18.8 | 17.9 | 12.8 | 15.35 | 12.14 | 8.67 | 13.53 | 10.7 | 7.64 |
| Whey protein conc. | 26.0 | 17.7 | 22.4 | 26.0 | 17.7 | 22.34 | 26.0 | 17.7 | 22.34 |
| 13/60 | 33.0 | 32.5 | 32.5 | 33.0 | 33.0 | 33.5 | 33.0 | 32.75 | 32.75 |
| Lactose | 15.24 | 26.04 | 26.55 | 19.12 | 31.8 | 29.77 | 20.94 | 33.5 | 31.55 |
| Premix | .25 | .25 | .25 | .25 | .25 | .25 | .25 | .25 | .25 |
| Dicalcium phosphate | 3.51 | 2.61 | 2.47 | 3.51 | 2.57 | 2.47 | 3.51 | 2.57 | 2.47 |
| Calcium carbonate | 1.47 | 1.37 | 1.40 | 1.73 | 1.36 | 1.40 | 1.73 | 1.36 | 1.4 |
| L-Lysine | .98 | 1.39 | 1.33 | .9 | 1.36 | 1.30 | .9 | 1.31 | 1.3 |

TABLE V-continued

| | Composition of Diets (DM) for C-1-94 CJ/OSU | | | | | | | | |
|---|---|---|---|---|---|---|---|---|---|
| Diet | C-30 (Starter) | C-30 (Grower) | C-30 (Finisher) | C-31 (Starter) | C-31 (Grower) | C-31 (Finisher) | C-32 (Starter) | C-32 (Grower) | C-32 (Finisher) |
| DL-Methionine | .20 | .32 | .31 | .24 | .31 | .30 | .24 | .31 | .3 |
| Calculated analysis | | | | | | | | | |
| Lactose | 34.84 | 40.9 | 44.22 | 38.72 | 47.06 | 47.6 | 40.54 | 48.81 | 49.23 |
| ME kcal/lb | 1921 | 1906 | 1905 | 1907 | 1904 | 1915 | 1905 | 1910 | 1907 |
| Protein | 20.25 | 16.0 | 16.0 | 20.34 | 16.0 | 16.0 | 20.34 | 16.0 | 16.0 |
| Fat | 19.24 | 19.56 | 19.66 | 19.87 | 19.67 | 20.64 | 19.87 | 20.12 | 19.65 |
| Lysine | 2.16 | 2.16 | 2.16 | 2.18 | 2.16 | 2.16 | 2.18 | 2.18 | 2.16 |
| Methionine | .55 | .55 | .55 | .55 | .55 | .55 | .55 | .55 | .55 |
| Calcium | 1.56 | 1.18 | 1.18 | 1.56 | 1.18 | 1.18 | 1.56 | 1.56 | 1.18 |
| Phosphorous | .89 | .66 | .66 | .89 | .66 | .66 | .89 | .89 | .66 |

TABLE V(a)

Comparison Between MSWF Ingredients And Nutrients of Diets Containing MSFW Feed Exp. C-1-93 CJ/OSU (dry matter basis)

| | MSWF feed | | |
|---|---|---|---|
| Item | CA-30 | C-31 | C-32 |
| Ingredient % | | | |
| Dry Matter (DM) | 100.0 | 100.0 | 100.0 |
| Crude Protein | 39.2 | 45.5 | 51.6 |
| Phosphorus (P) | .47 | .63 | .69 |
| Potassium (K) | 1.33 | 2.00 | 2.15 |
| Calcium (Ca) | .23 | .32 | .37 |
| Magnesium (Mg) | .20 | .27 | 2.9 |
| Sulfur (S) | .30E | .30E | .30E |
| Parts per million | | | |
| Manganese (Mn) | 25 | 32 | 36 |
| Iron (Fe) | 74 | 82 | 76 |
| Copper (Cu) | 8 | 14 | 15 |
| Zinc (Zn) | 35 | 40 | 48 |

E = Not analyzed, value is estimated
L/H = Lowest/highest possible value detectable by spectrograph The calves in the treatment groups A–E received diets containing 25% MSWF feed. The diets increased from 10.75 lbs containing 14.8% solids on day 36 to 19 lbs containing 19.9% solids on day 134.

When the calves in treatment group reached about 35 days of age, the diets became unpalatable. The MSWF feed of Examples 9–11, were discontinued, and MSWF feed from Examples 12–14, in which the pH was not adjusted, were given instead. After the change in the calves' diet, the feed consumption resumed to normal.

The calves in Group F were fed a diet that did not contain the MSWF feed of the present invention but instead they were fed commercial veal diet.

All calves were fed the same amount of feed twice daily throughout the study. They were individually weighed weekly and blood samples taken from each calf biweekly for analysis. All calves were maintained under conditions to support optimum performance. At the end of the study, the calves were slaughtered in a commercial veal plant where they were graded by color and yield. The average weight gain of the calves is presented below in Table VI.

TABLE VI

Summary of Results Calf Study II.
Average Daily Gain (ADG) at Select Intervals

| Calf Group | Diet | Wt. at Day 1 | 1–35 Average Daily Gain, ± SE[a] | 36–64 Average Daily Gain, ± SE[a] | 65–134 Average Daily Gain, ± SE[a] | Wt. at Day 134 |
|---|---|---|---|---|---|---|
| A | Diet C-30 50:50 WF/SF d 36-134 | 86.5 ± .65 | 1.31 ± .03 | 2.01 ± .02 | 2.76 ± .08 | 437.5 ± 10 |
| B | Diet C-31 25:75 WF/SF d 36-134 | 85.5 ± 1.55 | 1.28 ± .06 | 2.00 ± .03 | 2.74 ± .05 | 434 ± 8.2 |
| C | Diet C-32 10:90 WF/SF d-64-134 | 92.3 ± 2.63 | 1.29 ± .05 | 2.05 ± .05 | 2.88 ± .11 | 457.8 ± 15.9 |
| D | Diet C-30 50:50 WF/SF d 64-134 | 88.5 ± 5.01 | 1.03 ± .14 | 1.72 ± .05 | 2.79 ± .07 | 442 ± 9.12 |
| E | Diet C-31 25:75 WF/SF | 93.8 ± 3.57 | 1.08 ± .07 | 1.78 ± .06 | 2.71 ± .04 | 438.5 ± 6.96 |

TABLE VI-continued

Summary of Results Calf Study II.
Average Daily Gain (ADG) at Select Intervals

| Calf Group | Diet | Wt. at Day 1 | 1–35 | 36–64 Average Daily Gain, ± SE[a] | 65–134 | Wt. at Day 134 |
|---|---|---|---|---|---|---|
| F | d 64-134 Commercial Veal diet d 1-134 | 92.5 ± 7.92 | .86 ± .23 | 1.64 ± .14 | 2.59 ± .09 | 421.5 ± 12.47 |

[a]Standard Error

As can be seen from Table VI, the growth of the calves were similar to those in the first calf study. Blood analysis indicated comparable values for hemoglobin and hematocrit between the control calves and the calves fed the MSWF feed of the present invention.

Evaluation of MSWF feed as Lamb Feed

Lambs have more rapid relative growth rates, and more stringent dietary formulation requirements, that is, higher protein and energy requirements, than calves. Lambs require that feed be available at all times. There may be up to three day intervals between cleaning.

Newborn lambs were weaned at 24 hours of age and trained to consume a commercially available milk replacer diet from a Lam-Bar apparatus. Lam-Bar is an accepted milk replacer feeder for lambs having a nipple(s) attached to a tube inserted into the side of a covered pail. In the lamb studies, a commercial lamb milk replacer sold under the tradename "Advance," manufactured by Milk Specialties, Inc., Dundee, Ill., which contains 19.36% solids, was fed until the lambs were 14 days of age.

Thereafter the lambs were divided into groups and fed one of the diets shown in Table VII. The group of lambs that served as a control group, received the commercial lamb milk replacer throughout the study.

TABLE VII

Composition of Diets Fed to Lambs.

| Ingredient | S-16 | S-17 | S-18 | S-19 | S-21 | S-22 |
|---|---|---|---|---|---|---|
| Yeast | | | % | | | |
| MSWF feed | 14 | 14 | 18 | 18 | 17.78 | 21.33 |
| Wheat flour | 7 | 7 | 6 | 6 | 1.78 | 5.33 |
| Soy flour | 7 | 7 | 12 | 12 | 16 | 16 |
| Malted Barley | 10% | 1% | | | | |
| Whey protein concentrate | 41 | 41 | 21 | 21 | 20.5 | 19.25 |
| Marola (13/60) | 38.46 | 38.46 | 47 | 47 | 50. | 48.5 |
| Lactose | 0.46 | 0.46 | 6.6 | 6.6 | 5 | 4.25 |
| Dicalcium phosphate | 0.23 | 0.23 | 0.76 | 0.76 | .59 | 0.70 |
| Calcium carbonate | 1.81 | 1.81 | 1.74 | 1.74 | 1.76 | 1.74 |
| Citric Acid | 1.56 | 1.56 | 1.56 | 1.56 | 1.56 | 1.56 |
| Potassium sorbate | 0.625 | 0.625 | 0.625 | 0.625 | 0.625 | 0.625 |
| Vitamin and mineral premix | 0.56 | 0.56 | 0.56 | 0.56 | 0.56 | 0.56 |
| Lysine | 1.39 | 1.39 | 1.70 | 1.70 | 1.56 | 1.62 |
| Methionine | 0.48 | 0.48 | 0.50 | 0.50 | 0.48 | 0.49 |
| | 100.6 | 100.6 | 100.04 | 100.04 | 100.42 | 100.635 |

For the first study (S194), the lambs were fed either the commercial lamb milk replacer diet, diet S-16 or diet S-17. Diet S-17 contained the MSWF feed of Example 3 and S-16 contained MSWF feed of Example 4. The MSWF feed in Examples 3 and 4 contained equal parts of soy flour and wheat flour. The MSWF feed was combined with the other dietary ingredients as shown in Table 5 to produce several lamb feed formulations each containing 19.36% solids, 25% protein, 24% fat and 1968 kcal/lb of metabolizable energy. In the S-17 formulation, the MSWF feed was present at a level of 14% of the total diet and supplied 18.0% of the protein to the diet. The results are shown in Table VIII.

TABLE VIII

Average Daily Body Weight Gain Per Week of Lambs.

| Diet | Pen | Lamb Age, days | | |
|---|---|---|---|---|
| | | 14 | 21 | 28 |
| | | Daily gain per time interval, grams | | |
| all milk control | 1 | 231.3[a] | 254.0 | 299.4 |
| | 3 | 308.4 | 249.5 | 322.1 |
| | avg. | 269.9 | 251.8 | 310.8 |
| S-16 | — | — | N/A | N/A |
| S-17 | 4 | 308.4 | 217.8 | 263.1 |
| | 6 | 263.1 | 208.7 | 313.0 |
| | avg. | 285.8 | 213.3 | 288.1 |

EXP. S194
[a]Average of five lambs per pen

As indicated by the growth rate of the ten lambs fed the S-17 diet and that of the control lambs, the two diets produced lambs of equivalent weight. The S-17 formulation exhibited satisfactory suspension and feeder storage qualities. Diet S-16, which contained the MSWF feed of Example 4 which lacked yeast, became quite viscous in the feeder after one day. The viscosity made it difficult for the lambs to consume the feed from the lab bar after day 1. Accordingly, the MSWF feed of Example 4 is less preferred.

Lamb Study II

In the second study (S294) two pens of five two-week old lambs which had been raised on commercial all milk replacer were used to evaluate each diet. Diet S-18 which contained the MSWF feed of Example 5 and diet S-19 which contained the MSWF feed of Example 6, each contained a one to two ratio of wheat flour to soy flour. The MSWF feed provided 8.88% protein and 37% of the total protein in the 19.3% solids diet. However, the MSWF feed in S-18 lacked yeast.

After 1 day, the S-18 diet which did not contain yeast, became thick, and continued to thicken with time. For convenience, the experiment with S-18 was discontinued. Diet S-19 did not thicken as did S-18, and retained an acceptable viscosity throughout the three day interval between cleaning the feeders. The results are shown in Table IX.

TABLE IX

Average Daily Body Weight Gain Per Week of Lambs.

| | | Lamb Age, days | | |
|---|---|---|---|---|
| | | 14[b] | 21 | 28 |
| Diet | Pen | Daily gain per time interval, grams | | |
| all milk control | 2 | 213.2[a] | 385.6 | 358.3 |
| | 4 | 186.0 | 426.4 | 372.0 |
| | avg. | 199.6 | 406.0 | 365.2 |
| S-18* | | | | |
| S-19 | 3 | 254.0 | 249.5 | 403.7 |
| | 5 | 272.2 | 276.7 | 403.7 |
| | avg. | 263.1 | 263.1 | 403.7 |

EXP. S294
[a]Avg of five lambs per pen
*Experiment stopped
[b]All lambs fed an all milk diet until 14 days of age.

The growth rates of the lambs fed either the all milk diet or the S-19 diet between days 14 and 28 were equivalent, as shown in Table IX.

Lamb Study III

In the third lamb study (S394), diet S-21 and S-22 were compared to the all milk control diet. The wheat flour-soy flour ratio was 1 to 9 for diet S-21, which contained the MSWF feed of Example 7, and 1 to 3 for diet S-22 which contained the MSWF feed of Example 8. In diet S-21, the MSWF feed provided 9.19% protein, and constituted 37.6% of the total protein in diet S-21. The MSWF feed constituted 9.66% protein and 39.75% of the total protein for diet S-22. The process for preparing the MSWF feed in the preparation of both of these diets was the same as for S-19. Five lambs were started in each pen but by the end of the study four lambs remained in pens 4, 5 and 6. The results are shown in Table X.

TABLE X

Average Daily Weight Gain Per Week of Lambs.

| | | Lamb Age, days | | |
|---|---|---|---|---|
| | | 14[a] | 21 | 28 |
| Diet | Pen | Daily gain per time interval, grams | | |
| all milk control | 5 | 244.9 | 313.0 | 326.6 |
| | 6 | 285.8 | 381.0 | 258.6 |
| | avg. | 265.4 | 347.0 | 292.6 |
| S-21 | 3 | 272.1 | 358.3 | 426.4 |
| | 4 | 290.3 | 335.7 | 376.5 |
| | avg. | 281.2 | 347.0 | 401.5 |
| S-22 | 1 | 263.1 | 362.9 | 435.5 |
| | 2 | 303.9 | 358.3 | 499.0 |
| | avg. | 283.5 | 360.6 | 467.3 |

EXP. S394
[a]All lambs fed an all milk diet until 14 days of age.
S-21 - MSWF feed containing 25 parts wheat flour to 75 parts soy flour.
S-22 - MSWF feed containing 10 parts wheat flour to 90 parts soy flour.

As shown in Table X, both S-21 and S-22 produced lambs having weights which were equivalent to the weight of the control groups. The growth rate was excellent and comparable to that obtained with diet S-19.

The MSWF feed is also suitable food for other animals including humans. The MSWF feed may be given in human infant formula and mixed in non-infant foods particularly foods that contain soy protein.

Although certain embodiments of this invention have been shown and described, various adaptations and modifications can be made without departing from the scope of the invention as defined in the appended claims.

What is claimed is:

1. A method for producing a modified soy flour-wheat flour feed having reduced allergenic properties, comprising the following steps:
   a. providing soy flour, wheat flour, malted grain, and liquid comprising water;
   b. combining the soy flour, wheat flour and said liquid to provide a first mixture;
   c. gelatinizing the starch in the soy flour and wheat flour mixture of step b;
   d. reacting an effective amount of the malted grain with the mixture of step c to prove a second mixture, wherein the antigenic properties of the soy flour antigens is reduced;
   e. then terminating the chemical reactions.

2. The method of claim 1 wherein the second mixture comprises wheat flour and soy flour in a ratio of from about 2:1 to about 0.1:9.9, by weight; and
   from about 0.25 to about 50%, by weight, of the combined soyflour-wheat flour weight, of malted grain.

3. The method of claim 2 wherein the gelatinization of the starch of step c includes heating the mixture of step b to between about 122° to 230° F.

4. The method of claim 2, wherein the reaction of step d is conducted in a two step procedure by reacting at a first temperature of from about 75° to 125° F.; then reacting at second temperature of from about 113° to 160° F.

5. The method of claim 2 further comprising the steps of providing yeast and reacting the yeast with the second mixture after step (d).

6. The method of claim 2, wherein the malted grain comprises malted barley.

7. The method of claim 2 wherein: the malted grain comprises malted barley; gelatinization of the starch of step c includes heating the mixture of step b to between 122° to 230° F.; the reaction of step d is conducted in a two step procedure by reacting at a first temperature of from about 75° to 125° F.; then reacting at second temperature of from about 113° to 160° F.; and further comprising the steps of providing yeast and reacting the yeast with the second mixture after step (d).

8. The method of claim 7 wherein the second mixture comprises wheat flour and soy flour in a ratio of from about 1:1 to about 0.5:9.5, by weight; and from about 1 to about 15%, by weight, of the combined soyflour-wheat flour weight, of malted barley; and wherein the gelatinization of the starch of step c includes heating the first mixture of step b to about 180° F.; the reaction of step d is conducted in a two step procedure by reacting at a first temperature of from about 95° F.; then reacting at second temperature of from about 140° F.; and the temperature is adjusted during the yeast reaction to between about 60° to 122° F.

9. The method of claim 2, further characterized in that the soy flour is not treated with alcohol, dairy whey or acid.

10. The soy flour-wheat flour feed produced by the method of claim 2.

11. A soy flour-wheat flour feed comprising:
   wheat flour and soy flour in a ratio of from about 2:1 to about 0.1:9.9, by weight; and
   from about 0.25 to about 50%, by weight, of the combined soyflour-wheat flour weight, of malted grain,
wherein the feed is characterized in that it does not induce diarrhea when fed to cows.

12. The soy flour-wheat flour feed of claim 11, further comprising yeast cells or yeast cellular components.

13. The soy flour-wheat flour feed of claim 11, comprising:
   wheat flour and soy flour in a ratio of from about 1:1 to about 0.5:9.5, by weight; and
   from about 1 to about 15%, by weight, of the combined soyflour-wheat flour weight, of malted grain.

14. The soy flour-wheat flour feed of claim 13, comprising:
   wheat flour and soy flour in a ratio of about 1:9, by weight; and from about 1 to about 10%, by weight, of the combined soyflour-wheat flour weight, of malted barley.

15. The soy flour-wheat flour feed of claim 14, further comprising yeast cells or yeast cellular components.

16. A method of feeding an animal comprising the following steps:
   a. providing the soy flour-wheat flour feed of claim 2;
   b. feeding the soy flour-wheat flour feed to the animal.

* * * * *